US009632512B2

(12) United States Patent
Holtby et al.

(10) Patent No.: US 9,632,512 B2
(45) Date of Patent: Apr. 25, 2017

(54) WELL CONTAINMENT DEVICE

(71) Applicant: Katch Kan Holdings Ltd., Edmonton (CA)

(72) Inventors: Quinn A. J. Holtby, Edmonton (CA); Dallas L. Greenwood, Edmonton (CA)

(73) Assignee: Katch Kan Holdings Ltd., Edmonton (CA)

( * ) Notice: Subject to any disclaimer, the term of this patent is extended or adjusted under 35 U.S.C. 154(b) by 51 days.

(21) Appl. No.: 14/301,174

(22) Filed: Jun. 10, 2014

(65) Prior Publication Data

US 2014/0360593 A1 Dec. 11, 2014

Related U.S. Application Data

(60) Provisional application No. 61/833,800, filed on Jun. 11, 2013.

(51) Int. Cl.
| F16L 55/00 | (2006.01) |
| B65D 90/24 | (2006.01) |
| G05D 9/12 | (2006.01) |
| F16L 35/00 | (2006.01) |

(52) U.S. Cl.
CPC ............ *G05D 9/12* (2013.01); *F16L 35/00* (2013.01); *Y10T 137/5762* (2015.04); *Y10T 137/7287* (2015.04)

(58) Field of Classification Search
CPC . F16L 55/00; F16L 35/00; G05D 9/12; B65D 90/24
See application file for complete search history.

(56) References Cited

U.S. PATENT DOCUMENTS

| 2,699,960 A | 1/1955 | Callery et al. |
| 3,527,479 A | 9/1970 | Matthiessen |
| 4,219,693 A | 8/1980 | French |
| 4,403,794 A | 9/1983 | Curran et al. |
| 4,405,161 A | 9/1983 | Young et al. |
| 4,426,108 A | 1/1984 | Kesselman |

(Continued)

FOREIGN PATENT DOCUMENTS

| CA | 2187717 A1 | 4/1998 |
| CA | 151557 S | 9/2014 |

(Continued)

OTHER PUBLICATIONS

International Search Report mailed Aug. 19, 2014, issued in corresponding International Application No. PCT/CA2014/050530, filed Jun. 9, 2014, 3 pages.

(Continued)

*Primary Examiner* — Craig Schneider
*Assistant Examiner* — Kevin Barss
(74) *Attorney, Agent, or Firm* — Seed IP Law Group LLP

(57) ABSTRACT

A device for containment of fluid escaping from a pipe, comprising a can having a surrounding wall and a bottom: The bottom is formed of bottom segments that combine to form a bottom opening with a bottom inward facing sealing surface for sealing against the pipe. The surrounding wall is formed of wall segments that combine to form an enclosure defining an interior of the can. The drain further comprises a drain opening exposed to the interior of the can. The can may include fluid level sensors that activate a suction pump.

14 Claims, 6 Drawing Sheets

(56) References Cited

U.S. PATENT DOCUMENTS

| | | | |
|---|---|---|---|
| 4,826,215 A | | 5/1989 | Sullivan |
| 4,872,508 A | * | 10/1989 | Gordon ................. F16J 15/004 |
| | | | 166/66 |
| 4,917,190 A | | 4/1990 | Coppedge |
| 5,067,563 A | * | 11/1991 | Rode ...................... E21B 43/34 |
| | | | 166/84.2 |
| 5,092,631 A | | 3/1992 | Masnik et al. |
| 5,148,699 A | * | 9/1992 | Morse ..................... E21B 33/08 |
| | | | 166/84.1 |
| 5,150,751 A | | 9/1992 | Burton |
| 5,246,067 A | * | 9/1993 | Heinonen ............... E21B 33/08 |
| | | | 166/81.1 |
| 5,312,137 A | | 5/1994 | Nee |
| 5,394,939 A | | 3/1995 | Walker |
| 5,678,864 A | | 10/1997 | Brown |
| 5,775,419 A | * | 7/1998 | Gramlich ................ E21B 33/08 |
| | | | 166/81.1 |
| 6,286,593 B1 | | 9/2001 | Holtby |
| 7,264,449 B1 | | 9/2007 | Harned et al. |
| 7,637,692 B1 | | 12/2009 | Rose |
| 8,032,256 B1 | * | 10/2011 | Wolf ......................... E03F 5/22 |
| | | | 137/552.7 |
| 8,127,838 B2 | * | 3/2012 | Brewer ................. E21B 43/127 |
| | | | 166/81.1 |
| D744,063 S | | 11/2015 | Holtby et al. |
| 2002/0179300 A1 | * | 12/2002 | Gay ........................ E21B 33/08 |
| | | | 166/81.1 |
| 2007/0114113 A1 | * | 5/2007 | Muse ...................... E21B 19/15 |
| | | | 198/861.1 |
| 2008/0229819 A1 | | 9/2008 | Mayleben et al. |
| 2011/0036164 A1 | * | 2/2011 | Burdi .................... G01F 23/241 |
| | | | 73/303 |
| 2016/0169427 A1 | | 6/2016 | Holtby et al. |

FOREIGN PATENT DOCUMENTS

| | | |
|---|---|---|
| DE | 197 50 120 C1 | 4/1999 |
| FR | 2 605 378 A1 | 4/1988 |
| JP | 10-220681 A | 8/1998 |

OTHER PUBLICATIONS

Extended European Search Report, dated May 24, 2016, for European Application No. 15198590.0-1754, 8 pages.

Holtby et al., "Flange Joint Containment Device," Office Action, dated Mar. 28, 2016, for U.S. Appl. No. 14/729,992, 11 pages.

Extended European Search Report, dated Dec. 13, 2016, for European Application No. 14810390.6-1802, 8 pages.

* cited by examiner

WELL CONTAINMENT DEVICE

CROSS-REFERENCE TO RELATED APPLICATIONS

This application claims the benefit under 35 U.S.C. §119(e) of U.S. Provisional Application No. 61/833,800, filed Jun. 11, 2013.

TECHNICAL FIELD

Fluid containment at wells, particularly oil and gas wells.

BACKGROUND

The inventor Quinn Holtby has been a pioneer in the art of fluid containment, and has multiple patents for a variety of products used for fluid containment. Different oil and gas well environments pose different issues for the skilled person. One such environment is the slip joint where one tube passes through another with relative movement between them.

SUMMARY

A containment device (can) is proposed for use with slip joints in particular, but the can has other applications to different environments. There is therefore provided a device for containment of fluid escaping from a pipe, comprising a can having a surrounding wall and a bottom; the bottom being formed of bottom segments that combine to form a bottom opening with a bottom inward facing sealing surface for sealing against the pipe; the surrounding wall being formed of wall segments that combine to form an enclosure defining an interior of the can; and a drain having a drain opening exposed to the interior of the can.

In various embodiments, there may be included any one or more of the following features in any suitable combination: 1) a level sensor in the surrounding wall above the bottom, the level sensor having output indicative of a fluid level in the can; 2) at least one of the bottom and the surrounding wall incorporates the drain opening; 3) the device is provided in combination with a suction pump having a control, the control being responsive to output of the level sensor, and further comprising a tube connecting between the suction pump and the drain opening; 4) an upper sensor in the surrounding wall above the level sensor, the upper sensor having output indicative of a fluid level in the can, and the control being responsive to output of the upper sensor; 5) a third sensor is provided in the surrounding wall above the upper sensor, the third sensor having output indicative of a fluid level in the can, and further comprising an alarm, the alarm being responsive to the output from the third sensor; 6) a top is supported by the surrounding wall, the top being formed of top segments that combine to form a top opening with a top inward facing sealing surface for sealing against a tubular that extends out of the pipe; 7) the top inward sealing surface comprises an elastomeric sealing material; 8) the top, bottom and/or surrounding wall are formed of dielectric material; the surrounding wall is supported by ribs and 9) the can is stabilized on a pipe by stabilizing elements.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Figure 1:
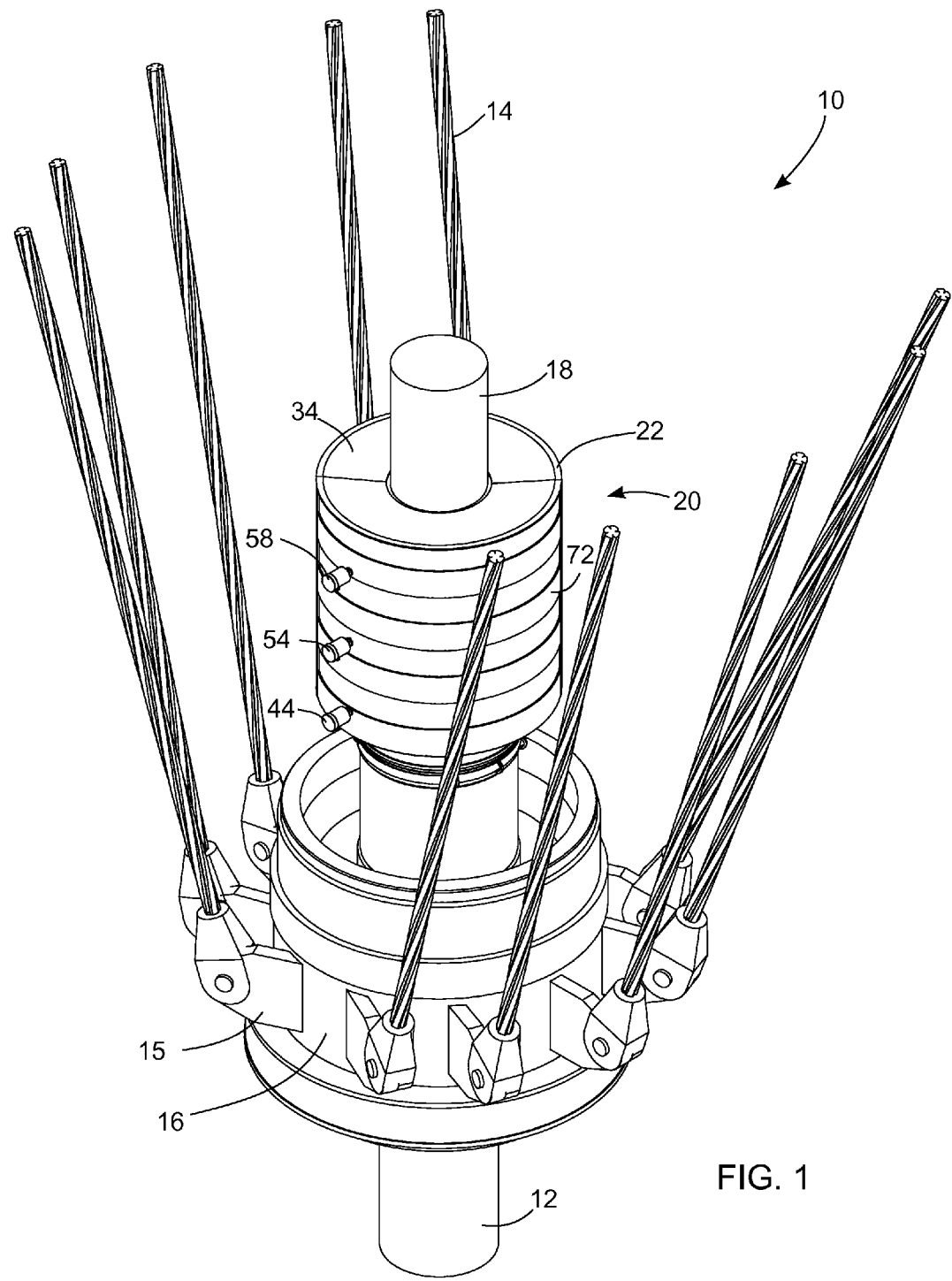
FIG. 1 is perspective view of a device for fluid containment including a containment can.

Referring to FIG. 1, there is shown a device 10 for containment of fluid escaping from a pipe 12. The pipe 12 may be for example a pipe 12 suspended on conventional cables 14 using lugs 15 of a conventional collar 16 that holds the pipe 12. The cables 14 may be secured to and suspended from an offshore rig (not shown), and the pipe 12 may extend downward into the sea, an ocean or lake. A tubular 18 may be provided in conventional manner inside the pipe 12, and may in use move within pipe 12. While a seal (not shown) is conventionally provided between the pipe 12 and tubular 18 where the pipe 12 terminates upwardly, fluids may escape from the joint between pipe 12 and tubular 18. The device 10 comprises a can 20 that is designed to contain and remove fluids that escape from the joint between the pipe 12 and tubular 18.

Figures 2, 2A:
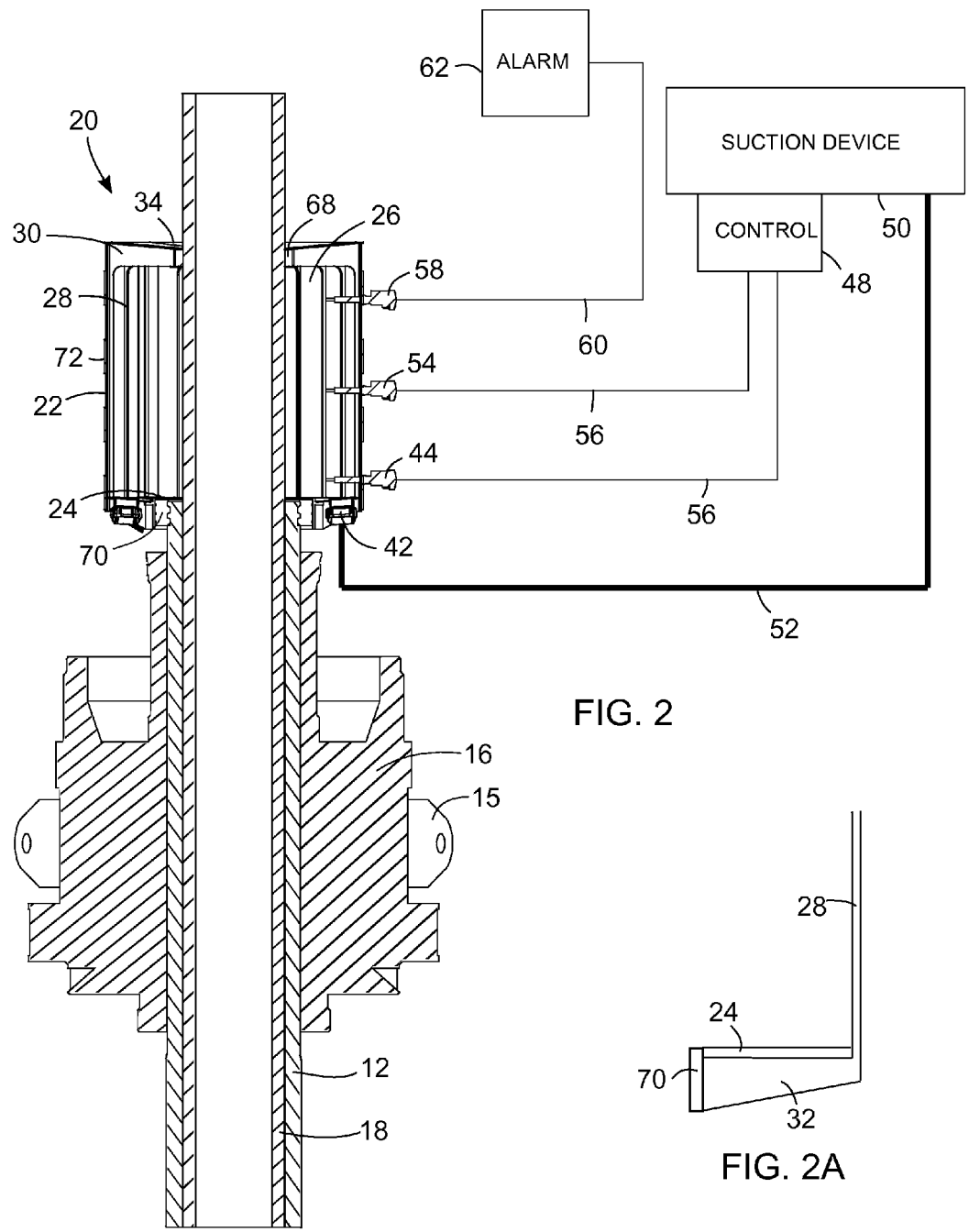
FIG. 2 is a section of the device of FIG. 1, without cables.
FIG. 2A shows a detail of the bottom of the can of FIG. 1.

Referring to FIG. 2, the can 20 has a surrounding wall 22 and a bottom 24. The surrounding wall 22 may have any suitable shape and may be cylindrical or nearly cylindrical, for example by being made up of multiple flat sheets 26. The flat sheets 26 may be supported by and welded to ribs 28. The ribs 28 may terminate upwardly in gussets 30 and downwardly in gussets 32. The gussets 30 may support a top 34 and the gussets 32 may be secured to and support the bottom 24 (FIG. 2A). The bottom 24 need not be flat as shown but could be conical or frusto-conical, and may taper with smaller diameter upwardly or downwardly. When the bottom 24 is frusto-conical and tapers with smaller diameter downwardly, it may be considered part of the surrounding wall 22, and the bottom is then just the part that surrounds the pipe 12. The bottom 24 may also widen downwardly, so that the part of the bottom 24 that surrounds the pipe 12 is still part of the bottom 24, but the part where the bottom 24 meets the surrounding wall is the lower than the part that surrounds the pipe 12.

Figure 3:
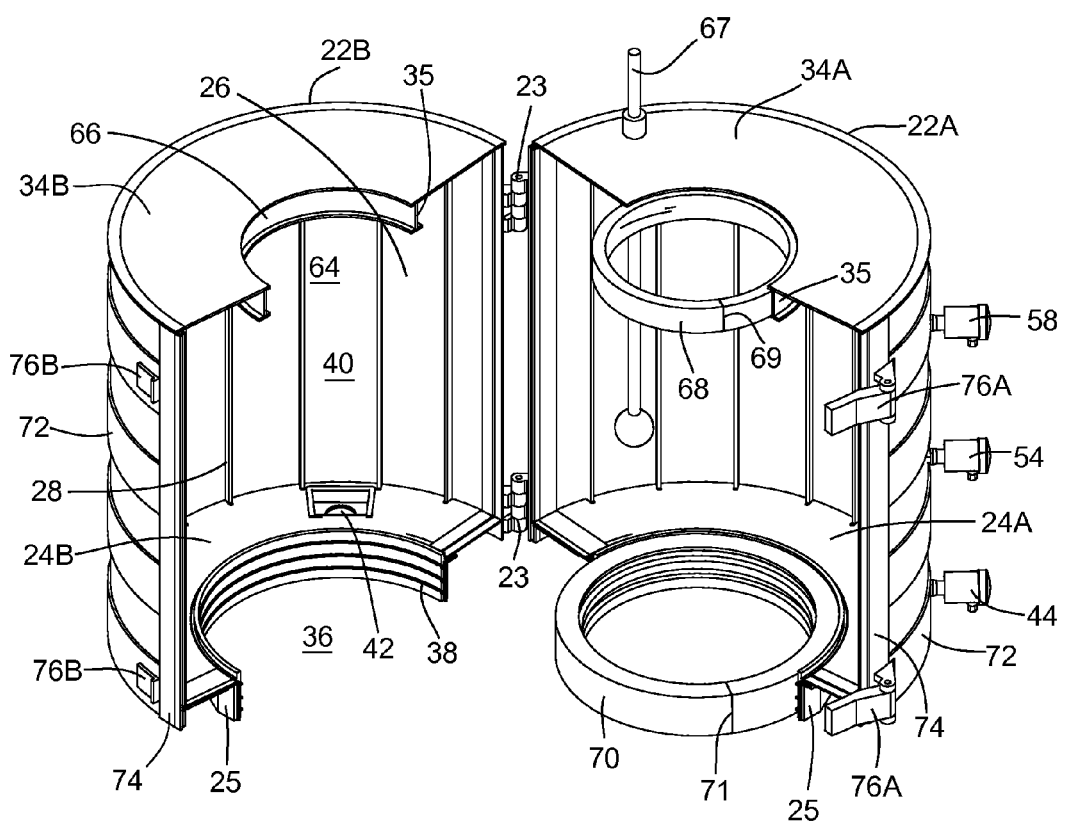
FIG. 3 shows a segmented containment can in two segments.

Referring to FIG. 3, the bottom 24 may be formed of bottom segments 24A and 24B, here shown as two, but may be more, that combine to form a bottom opening 36 with a bottom inward facing sealing surface 38 for sealing against the pipe 12. The surrounding wall 22 may be formed of wall segments 22A, 22B that combine to form an enclosure defining an interior 40 of the can 20. The segments 22A and 22B may be hinged together with hinges 23. A drain or drains 42 are normally provided in the can 20. The drain or drains 42 may have a drain opening exposed to the interior 40 of the can 20 by, for example, being incorporated in one or both of the bottom 24 or surrounding wall 22. It is preferred that level sensor 44 is located above where the bottom 24 seals against the pipe 12 to ensure that some fluids remain the lower interior of the can 20 where they may assist in lubricating the joint between the pipe 12 and tubular 18. In the case of a frusto-conical bottom 24 where the bottom 24 tapers downwardly, the drain or drains 24 may be in the bottom 24. In some embodiments, the drain or drains 42 may be provided by a tube (not shown) extending into the can 20 through any suitable part of the can 20, including the top 34.

A level sensor 44 may be provided in the surrounding wall 22 above the bottom 24. The level sensor 44 may be any suitable level sensor for detecting fluid that has an output indicative of fluid level in the can 20. As shown in FIG. 2, the output signal may be transferred wireless or by wire 56 to an external device. The external device may be a control 48 for a suction pump 50 that connects through a tube to the drain or drains 42 and that is sensitive to the output from the level sensor 44. The control 48 may be an on-off switch. Any suitable suction pump may be used for the suction pump 50, and it may be located at a suitable location at the site or on the rig. The pump 50 may pump fluid from the can 20 to a reservoir or holding tank (not shown).

In a non-preferred embodiment that may be acceptable in some circumstances, the control 48 may be have a timing function so that the suction pump 50 is turned on for a set period of time when fluid reaches the level of the sensor 44. In this example, the level sensor 44 would be located fairly high up in the can 20. In a preferred embodiment, there is also an upper sensor 54 in the surrounding wall 22 above the level sensor 44. The upper sensor 54 has output indicative of a fluid level in the can 20. The control 48 is responsive to output of the upper sensor 54 by a wireless or wired connection 56. In this embodiment, when fluid in the can 20 reaches the upper sensor 54, the suction pump 50 is turned on, and when the fluid level in the can 20 reaches the level sensor 44, the suction pump 50 is turned off. This embodiment thus maintains a level of fluid in the can at a fixed range. Like the level sensor 44, the upper sensor 54 may be any suitable fluid level sensor.

There may also be provided a third sensor 58 in the surrounding wall 22 above the upper sensor 54. The third sensor 58 has output indicative of a fluid level in the can 20 and may be connected wirelessly or by a wired connection 60 to an alarm 62 that is responsive to the output from the third sensor 58. The alarm 62 may be a physical, visible, audible or other suitable alarm. In an embodiment where the drain or drains 42 are connected via a tube to a separate reservoir, there may be only one sensor in the can 20 and this sensor may be connected wirelessly or by wires to the alarm 62 and no suction pump 50 need be used. The sensors 44, 54 and 58 may be inserted into openings in the surrounding wall 22 formed for the purpose of receiving the sensors 44, 54 and 58, and provided with suitable seals to prevent fluid loss through the openings. To provide some security against failure of the sensors 44, 54 and 58, the can 20 may be fitted with a mechanical float 67 to provide a visual signal of the level of fluid in the can 20. The mechanical float 67 may also be connected to other mechanisms or electrical controls to provide audible or electronic signals of a given level in the can 20, for example a high fluid level, requiring draining of fluid. The float 67 may be located on a side of the can 20 opposite to the sensors 44, 54 and 58.

Figure 4:
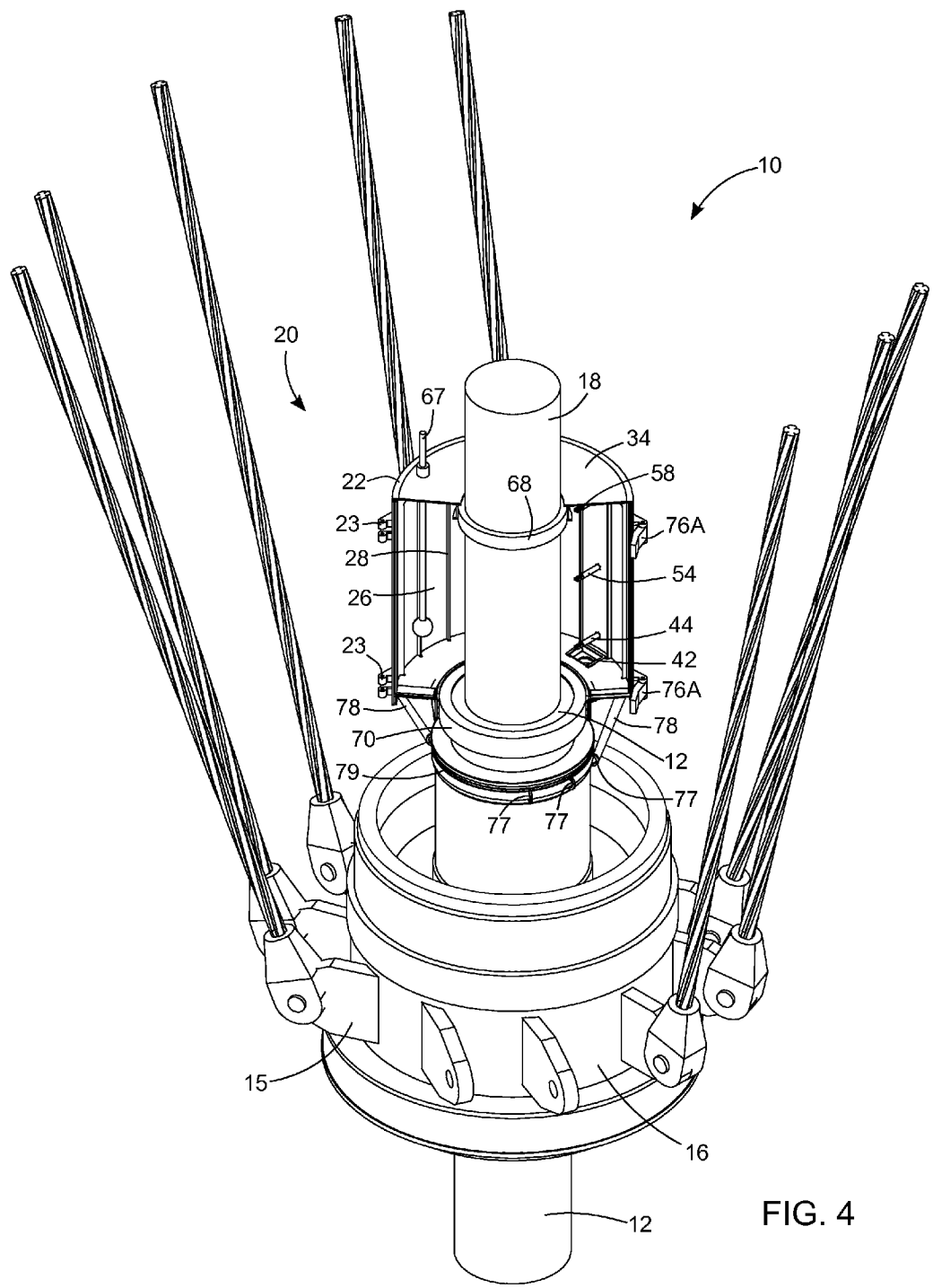
FIG. 4 shows the device of FIG. 1 with one half of the containment can cut away to show its interior.

The top 34 is supported by the surrounding wall 22 and is formed of top segments 34A, 34B that combine to form a top opening 64 with a top inward facing sealing surface 66 for sealing against the tubular 18. The top inward sealing surface 66 may comprise a surface of a lubricated or self-lubricating hydrocarbon resistant elastomeric sealing material such as polyethylene foam provided as an annular seal 68 around the tubular 18 (FIG. 4), preferably without a tension fit, so as to allow movement of the tubular 18 in relation to the pipe 12 and can 20. The annular seal 68 bears up against a wall 35 that forms part of the top 34 and the wall 35 is supported by inner portions of the gussets 30. Since the tubular 18 is normally in position when the can 20 is placed around the tubular 18, the annular seal 68 needs to be split, at least once as shown at 69, but may also be in more parts. The bottom inward sealing surface 38 preferably comprises a surface of lubricated or self-lubricating hydrocarbon resistant elastomeric sealing material such as polyethylene foam provided as an annular seal 70 tension fit to the pipe 12 to hold the can 20 securely on the pipe 12. The annular seal 70 is seated on a wall 25 that forms part of the bottom 24 and the wall 25 is supported by inner portions of the gussets 32. As with annular seal 68, the annular seal 70 needs to be split, at least once as shown at 71, but may also be in more parts. The annular seal 70 is made to have a tension fit on the pipe 12 by having a smaller inner diameter than the outer diameter of the pipe 12.

Preferably, the top 34, surrounding wall 22 and bottom 24 are all formed of a dielectric lightweight and strong material such as polyethylene. Light in this instance means light relative to a device made of metal. The weight depends on the size, but may be in the order of 500-1000 lbs. The device can be maneuvered into place using conventional booms and slings attaching to conventional attachment points on the can 20.

Figure 8:
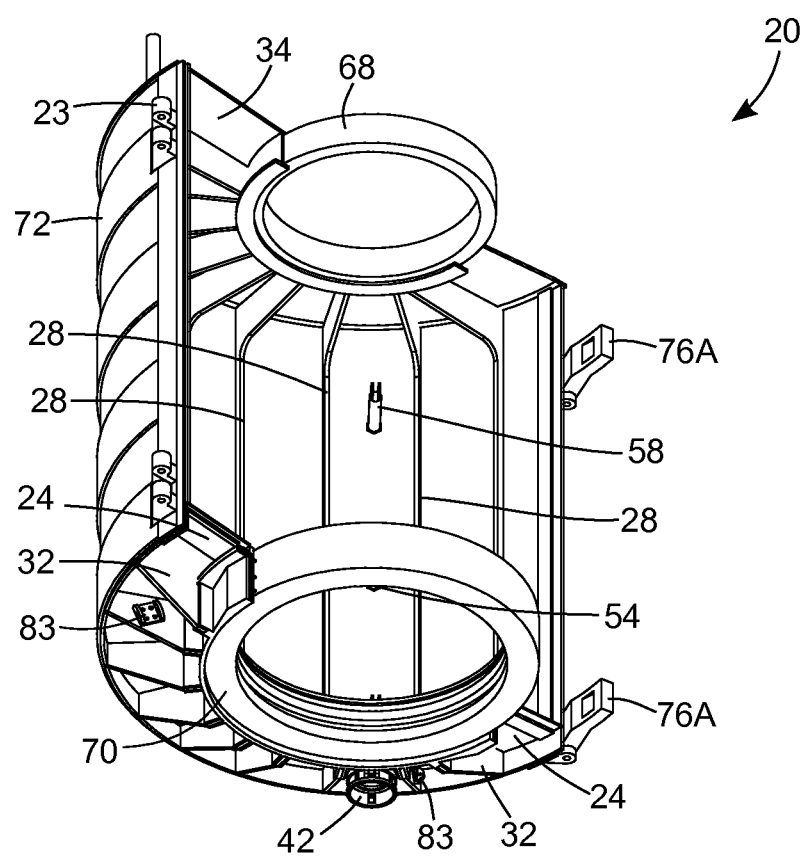
FIG. 8 is a perspective view of the bottom of the can of FIG. 1.

Horizontal bands 72 may be provided around the surrounding wall 22 for extra strength. The bands 72 terminate at vertical strips 74 (FIG. 3). The two (or more, if present) segments of can 20 may be held together on the pipe 12 by compression of the bottom 24 on to the pipe 12, with the seal 70 compressed onto the pipe 12 by any suitable fasteners such as latch 76A and hook 76B combinations, but may also be other fasteners such as clamps or bolts, that may for example attach to the vertical strips 74 in line with the bands 72. The latch 76A and hook 76B fasteners may be made of any suitable material attached to the can 20 by any suitable means, including by welding. Pressure on the annular seal 70 from the fasteners 76 is conveyed through the ribs 28, bottom 24, gussets 32 and wall 25. The dimensions of the top 34 and gussets 30 should be chosen so that there is less pressure on the tubular 18 than on the pipe 12 to allow for relative movement between the pipe 12 and tubular 18. For added security, the can 20 may be secured on the pipe 12 by stabilizing elements such as strapping 78, including conventional buckles, that is secured at one end to the can 20 and at an opposed end to half circle hoops 77 on a ring 79 (for example, of strapping) secured by any suitable means around the top of the pipe 12. A part (not shown) may be formed on the wall 22 of the can 20 to which is secured the strapping 78 or the strapping 78 may be attached to a ring (not shown) that extends around the can 20 or as shown in FIG. 8, the strapping 78 may be attached to gussets 32 for example, by a strapping attachment piece 83 being bolted onto a gusset 32. Several pieces of strapping 78 may be used, as many as required to stabilize the can 20 on the pipe 12. Other methods of stabilizing the can 20 on the pipe 12 may be used, for example by struts or cables (not shown) secured to the pipe 12 or other components such as the collar 16. The top 34 of the can 20 may also be secured by stabilizing elements to suitable structure at the site that is available for support.

Figure 5:
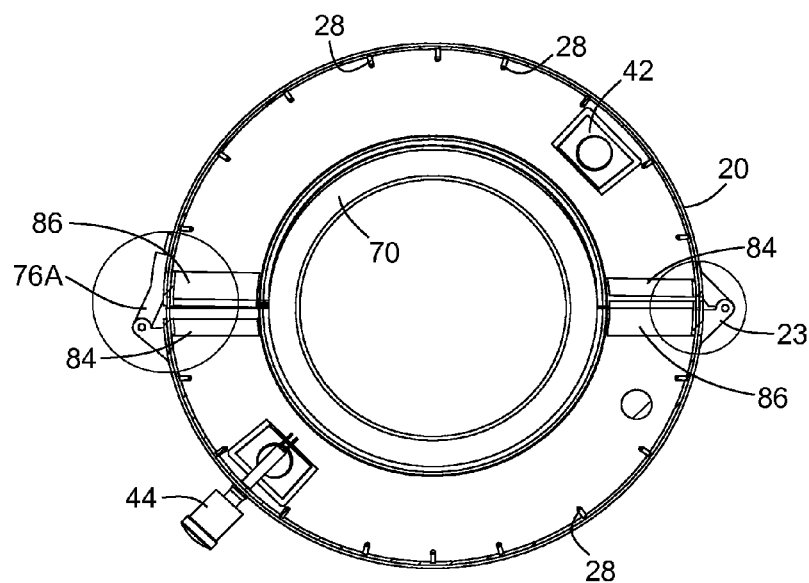
FIG. 5 shows a section of a can through one of the latches holding two parts together.
Figure 6:
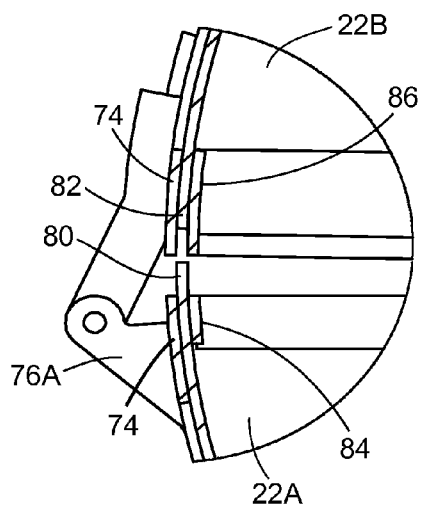
FIG. 6 is a top view, partly in section, of a latch for securing two segments of a can together.
Figure 7:
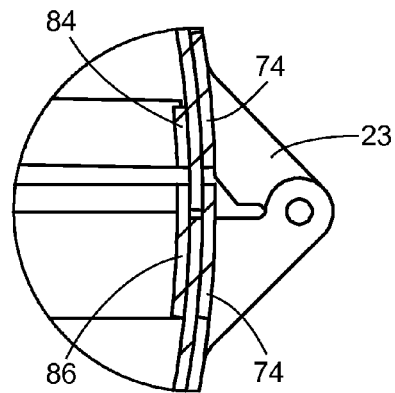
FIG. 7 is a top view, partly in section, of a hinge that may be used to secure two segments of a can together.

As shown in FIGS. 5-7, the latches 76A, 76B and hinges 23 hold the edges of the segments 22A, 22B together with an overlapping tongue 80 and groove 82 arrangement to form a seal against undesired leakage from the can 20. In FIG. 7, the tongue 80 is shown received by the groove 82, while in FIG. 6, the latch 76A is not yet pulled back into the over-the-top position so that the segments 22A, 22B are not pressed together and the tongue 80 and groove 82 are not engaged. When the latch 76A is pulled back on the hook (not shown in FIGS. 6 and 7), the tongue 80 and groove 82 engage to form a seal between the two segments of the can. The tongue 80 is formed from a sheet 26 that is part of the wall 22. A vertical reinforcing sheet 84 is placed on the inside of the wall 22 adjacent the edge of the segment 22A. A vertical reinforcing sheet 86 is placed on the inside of the wall 22 adjacent the edge of the segment 22B. Corresponding sheets extend across the bottom 24 to form a sealed tongue in groove joint across the bottom 24 as well. One of the sheets 74 forms a vertical exterior reinforcing sheet for the tongue 80 on the outside of the wall 22 adjacent the edge of the segment 22A. Another of the sheets 74 forms a vertical reinforcing sheet on the inside of the wall 22 adjacent the edge of the segment 22B. Corresponding sheets extend across the bottom 24 to form a sealed tongue in groove joint across the bottom 24 as well. Thus, the tongue 80 and groove 82 combination extend along the full height of the can 20 and across the bottom 24 as shown in FIGS. 6 and 7. The bands 72 terminate adjacent the vertical sheets 74. In some embodiments, other methods may be used to form a seal around the edges of the segments 22A, 22B.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims. Immaterial modifications may be made to the embodiments described here without departing from what is covered by the claims.

The embodiments of the invention in which an exclusive property or privilege is claimed are defined as follows:

1. A device for containment of fluid escaping from a pipe in combination with a suction pump having a control, comprising:
   a can having a surrounding wall and a bottom;
   the bottom being formed of bottom segments that combine to form a bottom opening with a bottom inward facing sealing surface for sealing against the pipe;
   the surrounding wall being formed of wall segments that combine to form an enclosure defining an interior of the can;
   a drain having a drain opening exposed to the interior of the can; and
   a level sensor in the surrounding wall above the bottom, the level sensor having output indicative of a fluid level in the can, the level sensor being located above where the bottom inward facing sealing surface seals against the pipe;
   the control being responsive to output of the level sensor, and further comprising a tube connecting between the suction pump and the drain opening.

2. The device of claim 1 in which at least one of the bottom and the surrounding wall incorporates the drain opening.

3. The device of claim 1 further comprising an upper sensor in the surrounding wall above the level sensor, the upper sensor having output indicative of a fluid level in the can, and the control being responsive to output of the upper sensor.

4. The device of claim 3 further comprising a third sensor in the surrounding wall above the upper sensor, the third sensor having output indicative of a fluid level in the can, and further comprising an alarm, the alarm being responsive to the output from the third sensor.

5. The device of claim 1 further comprising a top supported by the surrounding wall, the top being formed of top segments that combine to form a top opening with a top inward facing sealing surface for sealing against a tubular that extends out of the pipe.

6. The device of claim 5 in which the top inward sealing surface comprises an elastomeric sealing material.

7. The device of claim 5 in which the top is formed of dielectric material.

8. The device of claim 1 in which the surrounding wall is supported by ribs, and each rib terminates upwardly in an upper gusset that supports the top.

9. The device of claim 8 in which each rib terminates downwardly in a lower gusset that is secured to the bottom.

10. The device of claim 1 in which the bottom and surrounding wall are formed of dielectric material.

11. The device of claim 1 in which the surrounding wall is formed of welded sheets.

12. The device of claim 1 in which the bottom inward sealing surface comprises an elastomeric sealing material.

13. The device of claim 1 further comprising an alarm that is responsive to the output of the level sensor.

14. The device of claim 1 in which the pipe is held in position under tension by cables.

* * * * *